(12) United States Patent
Ye

(10) Patent No.: US 7,752,149 B2
(45) Date of Patent: Jul. 6, 2010

(54) METHOD AND APPARATUS FOR DETERMINING THE VARIABLE DEPENDENCY

(75) Inventor: Fujun Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 98 days.

(21) Appl. No.: 12/244,111

(22) Filed: Oct. 2, 2008

(65) Prior Publication Data

US 2009/0144210 A1 Jun. 4, 2009

Related U.S. Application Data

(63) Continuation of application No. PCT/CN2007/000354, filed on Feb. 1, 2007.

(30) Foreign Application Priority Data

Apr. 4, 2006 (CN) .................. 2006 1 0072049

(51) Int. Cl.
*G06F 15/18* (2006.01)
(52) U.S. Cl. ..................................... 706/12
(58) Field of Classification Search .................. 706/12
See application file for complete search history.

(56) References Cited

U.S. PATENT DOCUMENTS 6,185,516 B1 * 2/2001 Hardin et al. ................. 703/2
6,502,082 B1 * 12/2002 Toyama et al. ............... 706/16

FOREIGN PATENT DOCUMENTS

| JP | 2004-220236 A | 8/2004 |
| JP | 2005-107748 A | 4/2005 |
| WO | WO 2005/124580 A1 | 12/2005 |

* cited by examiner

*Primary Examiner*—Michael B Holmes
(74) *Attorney, Agent, or Firm*—Leydig, Voit & Mayer, Ltd.

(57) ABSTRACT

A method and an apparatus for determining variable dependency are disclosed. In the present invention, a variable dependency is determined in advance arbitrarily; partial variables are selected from the current variable dependency, and a legitimate superior variable set is re-selected for each of the partial variables, and the new variable dependency is stored only if it meets the criterion of acceptance; when the termination criterion for establishing variable dependency is met, the optimal variable dependency is determined from all variable dependencies. Because the existing variable dependency is not taken as a reference when the new variable dependency is created, the new variable dependency is not misled by the existing variable dependency, and the time for finding the globally optimal variable dependency can be shortened.

21 Claims, 11 Drawing Sheets

METHOD AND APPARATUS FOR DETERMINING THE VARIABLE DEPENDENCY

CROSS-REFERENCE TO RELATED APPLICATIONS

This application is a continuation of International Patent Application No. PCT/CN2007/000354, filed Feb. 1, 2007, which claims priority to Chinese Patent Application No. 200610072049.3, filed Apr. 4, 2006, both of which are hereby incorporated by reference in their entirety.

FIELD OF THE INVENTION

The present invention relates to the technical field of data processing, in particular, to a method and an apparatus for determining variable dependency.

BACKGROUND OF THE INVENTION

As more and more information and data are produced and accumulated, it is very necessary to discover rules among vast information and data. The discovery and analysis of rules in data have been widely used in computer vision, speech recognition, biological computing, risk analysis, therapeutic treatment solution finding, forecasting, information retrieval, and intelligent systems, so as to carry discovery, decision optimization, and forecasting regularly. The Probabilistic Graphical Model is one of the most important and widely used models to discover dependency among multiple variables, and it is also referred to as Bayesian Network, Belief Network, or Probabilistic Independence Network.

A Bayesian Network is a Directed Acyclic Graph (DAG), in which the nodes represent the variables in the domain, and the edges represent direct conditional probabilities between variables. FIG. 1 is a schematic diagram of a Bayesian Network, where the nodes $X_1$, $X_2$, $X_3$, $X_4$ and $X_5$ represent 5 variables, and an edge exists between variable $X_1$ and $X_2$, between $X_1$ and $X_3$, and between $X_2$ and $X_4$. The parent-child relationship between the nodes can be determined with the direction of the edge; for example, if the edge points from $X_i$ to $X_j$, then $X_i$ is referred to as the parent of $X_j$, and $X_j$ is referred to as a child of $X_i$; it can be seen that $X_1$ is the parent of $X_2$, and $X_2$ is a child of $X_1$. If a path exists from node $X_i$ to node $X_j$, then $X_i$ is referred to as an ancestor of $X_j$, and $X_j$ is referred to as a descendent of $X_i$; it can be seen that a path exists from $X_1$ to $X_5$, and therefore $X_1$ is an ancestor of $X_5$, and $X_5$ is a descendent of $X_1$.

Due to the fact that each variable is independent of the non-descendent set and non-parent set of the variable in the Bayesian Network, the joint probability in the Bayesian Network can be broken down to the product of conditional probabilities of all variables, i.e.:

$$P(X_1, \ldots, Xn) = \prod_{i=1}^{n} P(X_i \mid PaB(X_i)) \quad (1)$$

where $P(X_1, \ldots, X_n)$ is the joint probability in Bayesian Network B, $X_1, \ldots, Xn$ are n nodes in Bayesian Network B, and $PaB(X_i)$ is the parent set of node $X_i$ in Bayesian Network B. For example, the joint probability in the Bayesian Network shown in FIG. 1 is:

$$P(X_1,X_2,X_3,X_4,X_5)=P(X_5|X_4)*P(X_4|X_2,X_3)*P(X_3|X_1)\\*P(X_2|X_1)*P(X_1)$$

A Bayesian Network that represents variable dependency can be constructed with the records of variables mainly through two steps: producing Bayesian Networks, and selecting a Bayesian Network or discovering the feature. Producing Bayesian Networks is a mechanism that produces Bayesian Networks with the records of existing variables; selecting a Bayesian Network is to select the optimal Bayesian Network or an equivalent class of the optimal Bayesian Network as the Bayesian Network to be used finally from the produced Bayesian Networks; discovering the feature is to find out the community or feature among the produced Bayesian Networks, according to certain criteria. A feature discovery is usually used in the cases in which the records of variables are not enough; in such cases, usually multiple different Bayesian Networks have higher joint probabilities and it is not unreasonable to select one of the Bayesian Networks to describe the dependency among the variables; instead, the dependency among the variables should be described with the community or feature among the Bayesian Networks that have higher joint probabilities, i.e.:

$$P(f \mid D) = \frac{\sum_{B} P(B \mid D)\delta(B_f)}{\sum_{B} P(B \mid D)} \quad (2)$$

where P(f|D) represents the result-feature probability of all Bayesian Networks that are produced; P(B|D) represents the conditional probability of B to D, D represents the records of variables, B represents the Bayesian Networks that are produced, and f represents the feature, such as a specific edge, a specified path, or Markov Blanket feature, etc.; if f exists in B, then $\delta(B_f)=1$; if f does not exist in B, then $\delta(B_f)=0$.

FIG. 2 is a flow diagram of producing a Bayesian Network in the prior art. As shown in FIG. 2, the steps are as follows:

Step 201: The records of the variables are obtained.

Step 202: Supposing that each variable maps to a node in the Bayesian Network, a sequential relationship for the nodes is arbitrarily determined.

For a node in the node sequence, all nodes before the node are referred to as preceding nodes, for example, in Bayesian Network A, because node $X_5$ points to node $X_2$ and node $X_2$ points to node $X_3$, nodes $X_5$ and $X_2$ are preceding nodes for node $X_3$.

Step 203: The parent set with higher probabilities is selected for each node, in accordance with the determined node sequence and the records of the variables.

The steps for selecting the parent set with higher probabilities for each node are as follows:

First, because the first node in the node sequence has no preceding node, the parent set of the first node can be set to a null set φ.

Next, the parent set can be selected for the second node and subsequent nodes in the node sequence.

The steps for selecting the parent set for each node are as follows:

A. The probabilities that the node takes its preceding nodes and null set as its first parent node are calculated, and the preceding node or null set corresponding to the highest probability is selected as the first parent node of the node.

If the first parent node is null set, it indicates the parent set of the node is a null set, and therefore it is unnecessary to perform the subsequent steps.

B. The probabilities that the node takes its preceding nodes as its second parent node are calculated, the probabilities that are higher than the probability that the node gives the first parent node are selected from the calculated probabilities, and the preceding node corresponding to the highest probability among the selected probabilities is taken as the second parent node of the node.

If all the probabilities obtained in the calculation are lower than the probability that the node gives the selected first parent node, it indicates the parent set of the node only contains one parent node, i.e., the first parent node selected in step A; in that case, it is unnecessary to perform the subsequent steps.

C. The probabilities that the node takes its preceding nodes as its third parent node are calculated, the probabilities that are higher than the probabilities that the node gives the selected first and second parent nodes are selected from the probabilities obtained in calculation, and the preceding node corresponding to the highest probability among the selected probabilities is taken as the third parent node of the node.

If all the probabilities obtained in the calculation are lower than the probabilities that the node gives the selected first and second parent nodes, it indicates the parent set of the node only contains two parent nodes, i.e. the first parent node selected in step A and the second parent node selected in step B; in that case, it is unnecessary to perform the subsequent steps.

Subsequent parent nodes for the node are selected in the same way.

For example, supposing that there are four nodes: $X_1, X_2, X_3$ and $X_4$ and the node sequence determined in step 202 is $X_2, X_4, X_1, X_3$, the parent set of node $X_1$ can be selected as follows:

Step 1: The first parent node is added for node $X_1$, i.e. preceding node $X_2$ or $X_4$, or a null set.

Step 2: The probability that node $X_1$ takes node $X_2$ as its parent node, the probability that node $X_1$ takes node $X_4$ as its parent node, and the probability that node $X_1$ takes null set as its parent node are calculated, and the node with the highest probability is taken as the first parent node of node $X_1$.

Here, node $X_4$ is selected as the first parent node of node $X_1$.

Step 3: The second parent node is added for node $X_1$, i.e. the preceding node $X_2$.

Step 4: The probabilities that node $X_1$ takes node $X_4$ and node $X_2$ as its parent nodes are calculated.

Step 5: It is judged whether the probability that node $X_1$ takes node $X_4$ and node $X_2$ as its parent nodes are higher than the probability that node $X_1$ takes node $X_4$ as its parent node; if the judging result is positive, select node $X_4$ and node $X_2$ as the parent nodes of node $X_1$, i.e. the parent set of node $X_1$ is $Pa(X_1)=\{X_4, X_2\}$; otherwise, select node $X_4$ as the parent node of node $X_1$, i.e. the parent set of node $X_1$ is $Pa(X_1)=\{X_4\}$.

Step 204: A Bayesian Network is constructed in accordance with the parent sets selected for the variables.

Step 205: It is judged whether the criterion for stopping the loop is met now; if the criteria are met, Step 207 is performed; otherwise, Step 206 is performed.

The criterion for stopping the loop can be: the Bayesian Network has been established for a duration longer than the predefined duration, or the joint probability of the current Bayesian Network is equal to the predefined joint probability, or the result-feature probability of the current Bayesian Network is lower than the predefined result-feature probability, etc.

Step 206: The weights of the edges in all of the retained Bayesian Networks are determined, and thereby the new node sequence is determined, and then the process returns to Step 203.

Step 207: The conditional probability distribution of the node in the retained Bayesian Networks is determined, i.e. the probabilities that the node gives the current preceding nodes of the node are calculated.

However, the method described above has a drawback, i.e. it is very difficult to produce the optimal Bayesian Network that is based on the node sequence, because: if the produced Bayesian Network contains wrong edge information, the resulting new node sequence tends to be misled by the wrong edge information, and thereby it will take much longer time to find the globally optimal Bayesian Network.

SUMMARY OF THE INVENTION

The present invention provides a method and an apparatus for determining variable dependency, so as to accelerate the process of finding the globally optimal variable dependency.

The technical scheme of the present invention is implemented as follows:

For the better understanding, hereunder the parent variables of a child variable are referred to as the superior variables of the child variable, and all descendant variables under a parent variable are referred to as the subordinate variables of the parent variable.

A method for determining variable dependency includes:

A. determining initial variable dependency among variables arbitrarily, selecting partial variables from the variables, and deleting superior variables of the partial variables from a recent variable dependency;

B. selecting legitimate superior variable sets from all variables for each of the partial variables respectively with records of the variables, and obtaining a new variable dependency; judging whether to accept the new variable dependency; if the new variable dependency is acceptable, storing the new variable dependency and performing Step C; otherwise, performing Step C directly; and C. judging whether a criterion for stopping a loop is met; if the criterion is met, determining an optimal variable dependency from all variable dependencies stored; otherwise, returning to Step A to re-select partial variables.

An apparatus for establishing variable dependency includes:

a superior variable set determining module, configured to re-select a superior variable set for each of partial variables with the variable records from external input and a current variable dependency, and output a mapping relationship between each of the partial variables and the selected superior variable set;

a variable dependency establishing module, configured to determine an initial variable dependency, update a current variable dependency stored locally in accordance with the mapping relationship between each variable and the superior variable set selected for the variable that is sent from the superior variable set determining module, and then output the updated variable dependency;

a variable dependency judging module, configured to judge whether to accept the variable dependency that is sent from the variable dependency establishing module; if the variable dependency is acceptable and no termination instruction is received, output the variable dependency to the superior variable set determining module, the variable dependency establishing module, and an optimal variable dependency determining module; if the variable dependency is acceptable and a termination instruction is received, output the variable dependency only to an optimal variable dependency determining module;

a termination judging module, configured to judge whether the termination criterion is met; if the termination criterion is met, send a termination instruction to the variable dependency judging module and the optimal variable dependency determining module; and the optimal variable dependency determining module, configured to determine an optimal variable dependency from all of the variable dependencies that from the variable dependency judging module, after a termination instruction is received from the termination judging module.

Compared with the prior art, in the present invention, a variable dependency is determined in advance arbitrarily; partial variables are selected from the new variable dependency, and legitimate superior variable sets are re-selected for each of the partial variables, and the new variable dependency is retained only if it meets the criterion of acceptance; when the termination criterion for establishing variable dependency is met, the optimal variable dependency is determined from all variable dependencies. Because the existing variable dependency is not taken as a reference when the new variable dependency is created, the new variable dependency is not misled by the existing variable dependency, and the time for finding the globally optimal variable dependency can be shortened.

DETAILED DESCRIPTION OF THE EMBODIMENTS

The variables mentioned in the present invention refer to events or objects, attributes of events, or attributes of objects under certain conditions, such as multiple features of a specific event abstracted from a specific environment within a specific time range.

The embodiment provided in the present invention is to: first, preliminarily determine a variable dependency among all variables preliminarily, select a variable subset from the current variable dependency, and then re-select a parent variable set for each of the variables in the subset with an importance sampling method or the highest probability selection method, and thereby produce new variable dependencies.

Figure 1:
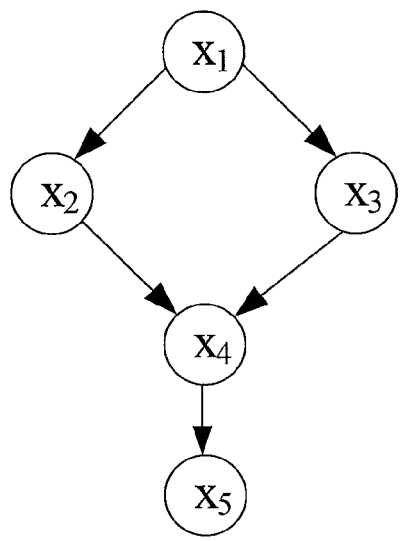
FIG. 1 is a schematic diagram of a Bayesian Network.
Figure 2:
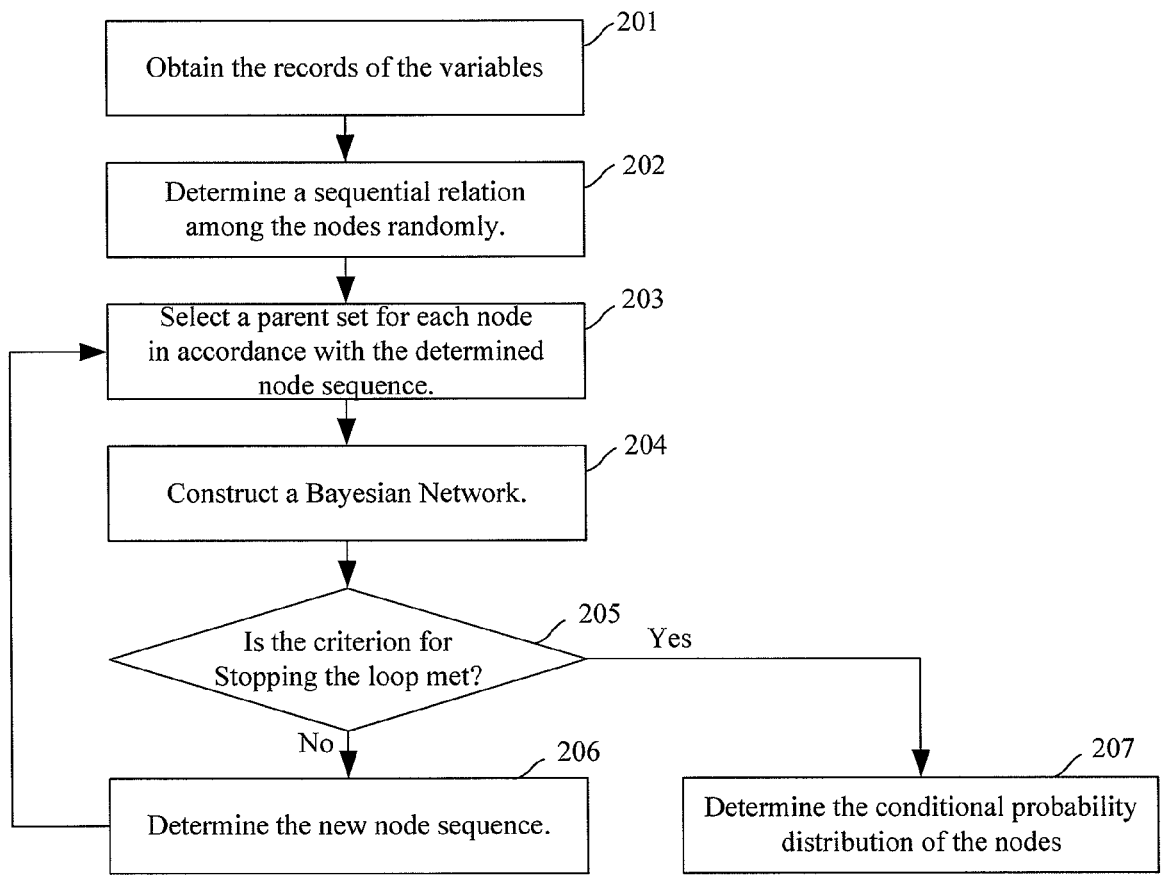
FIG. 2 is a flow diagram of establishing a Bayesian Network in the prior art.
Figure 3:
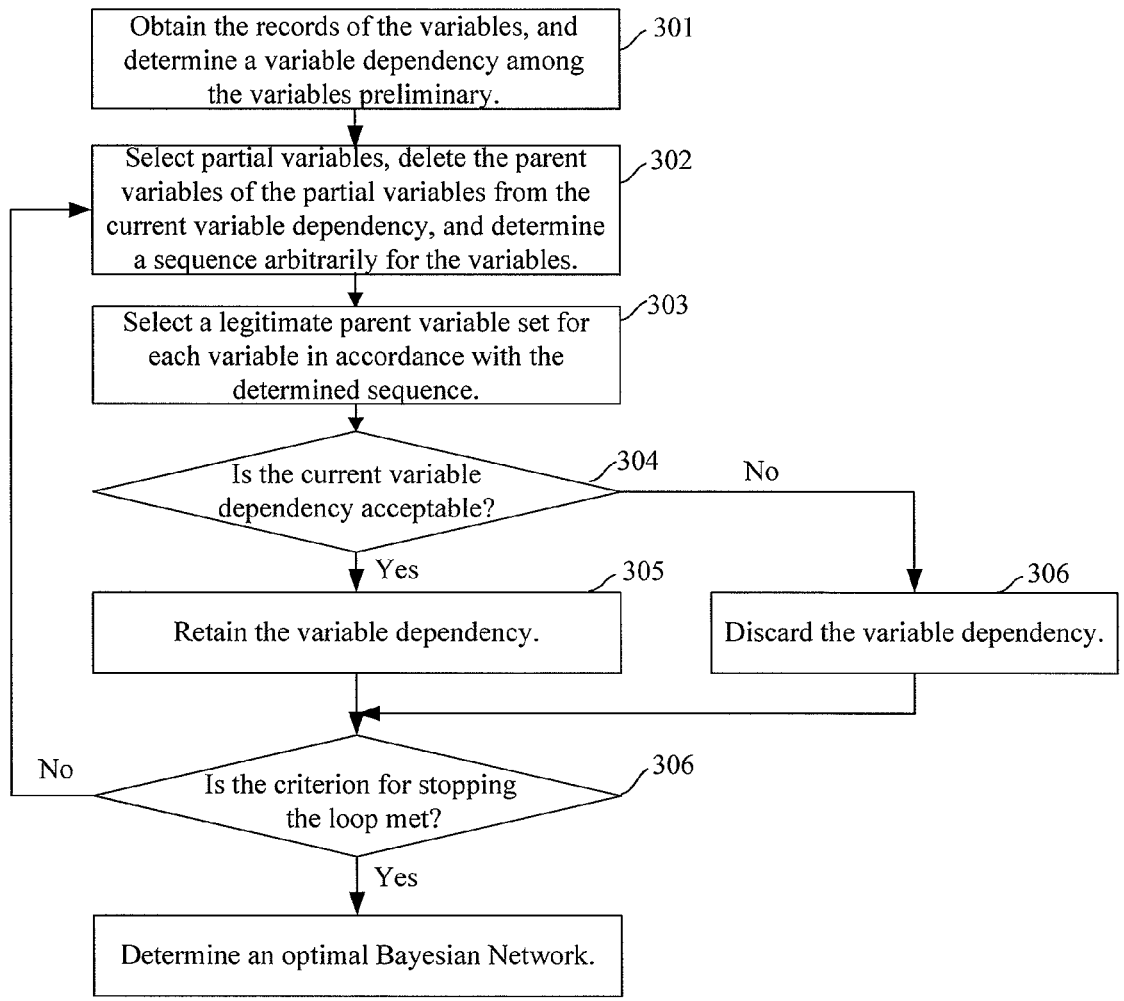
FIG. 3 is a flow diagram of the method for establishing variable dependency provided in the present invention.

FIG. 3 is a flow diagram of the method for determining variable dependency provided in the present invention; as shown in FIG. 3, the steps are as follows:

Step 301: The records of the variables are obtained, and the parent-child relationship among the variables arbitrarily is determined, and thereby a variable dependency preliminarily is preliminarily determined.

Step 302: Partial variables are selected from the variables, the parent variables of the partial variables deleted from the current variable dependency, and a sequence of the partial variables arbitrarily is determined.

Here, the partial variables can be selected arbitrarily or selected under predefined rules; the number of the partial variables can be one or more than one.

Step 303: Legitimate parent variable sets are selected for each of the partial variables, in the determined sequence of the partial variables.

Step 304: It is judged whether the current variable dependency is acceptable; if the current variable dependency is acceptable, Step 305 is performed; otherwise, Step 306 is performed.

Step 305: The variable dependency is retained and taken as the current variable dependency, and then the process goes to Step 307.

Step 306: The variable dependency is discarded, and the last variable dependency is taken as the current variable dependency.

Step 307: It is judged whether the criterion for stopping the loop is met; if the criterion is met, the optimal variable dependency is determined in accordance with the retained variable dependencies; otherwise, the process returns to Step 302.

The result-feature probabilities of the retained variable dependencies can be calculated, and then the optimal variable dependency can be determined in accordance with the result-feature probabilities; or, the joint probability of the retained variable dependencies can be calculated, and the variable dependency with the highest joint probability can be determined as the optimal variable dependency.

The number of the optimal variable dependency can be one or more than one.

In the present invention, the variable dependency can be represented with a Bayesian Network, and the process of determining the variable dependency includes a process of establishing the variable dependency and a process of applying the variable dependency. Hereunder, the present invention will be further detailed in an example of establishing and applying a Bayesian Network.

Figure 4:
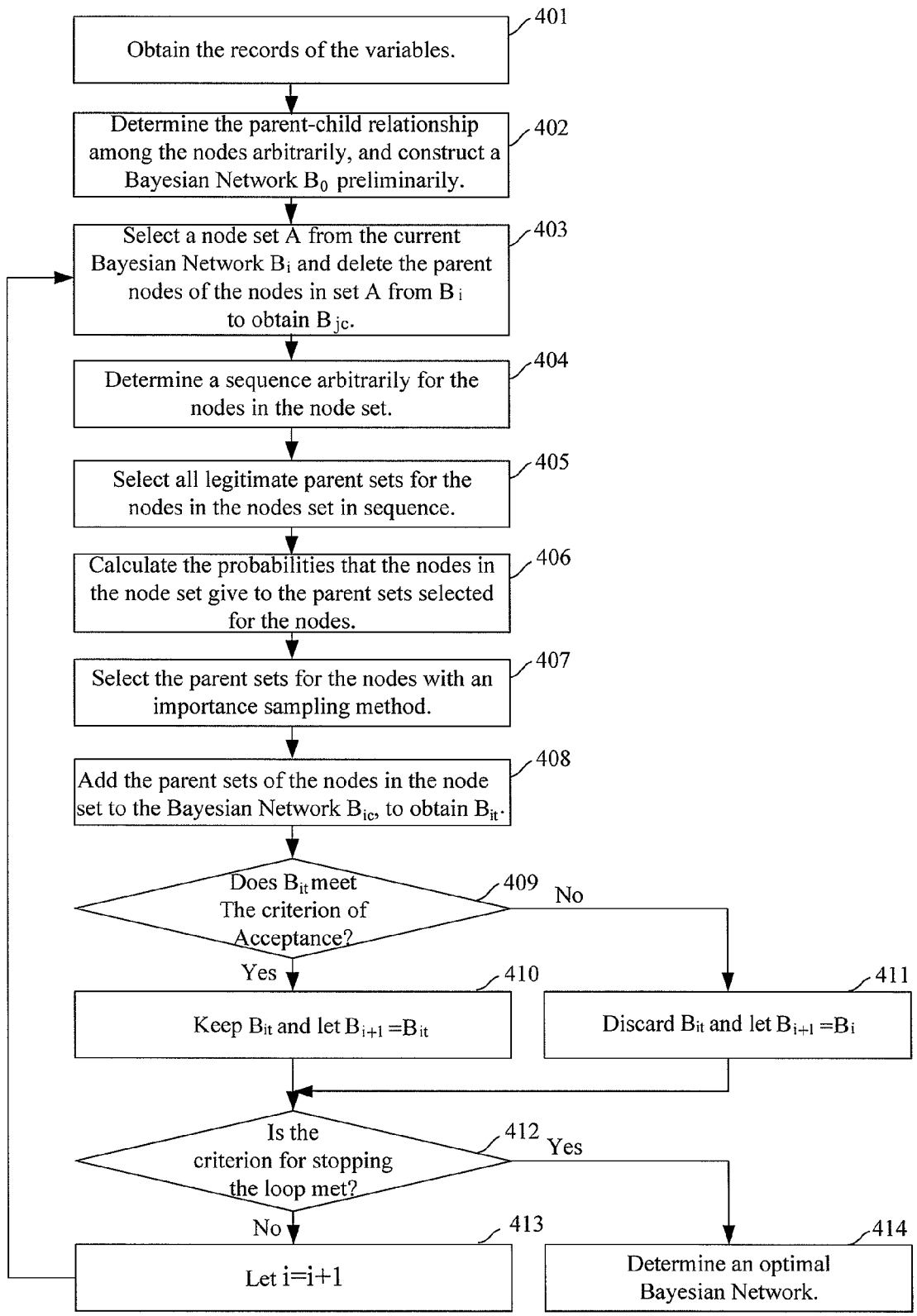
FIG. 4 is a flow diagram of embodiment 1 of the method for establishing a Bayesian Network in the present invention.

FIG. 4 is a flow diagram of embodiment 1 of the method for establishing a Bayesian Network in the present invention; as shown in FIG. 4, the steps are as follows:

Step 401: The records of the variables are obtained.

Step 402: Each variable is set to correspond to a node, the parent-child relationship among the nodes arbitrarily is determined, and then a Bayesian Network $B_0$ preliminarily is preliminarily constructed in accordance with the parent-child relationship among the nodes arbitrarily.

Step 403: A node set A is selected in the current Bayesian Network $B_i$ (i is an integer and $i \geq 0$) arbitrarily, and the parent nodes in node sets A from B are deleted, to thereby obtain a Bayesian Network $B_{ic}$.

Specifically, all descendents of the nodes can be found out first in $B_i$, and then a node $X_i$ can be selected arbitrarily from the nodes with descendents, and m nodes $X_{ik}$ (k=1, 2, ..., m) can be selected from the descendent set of node $X_i$ (m is an integer and $m \geq 0$), to obtain a node set $A=\{X_i, X_{ik}$ (k=1, 2, ..., m)$\}$, i.e., the node set of the selected nodes; the parent nodes of the nodes in node set A can be deleted from $B_i$, to obtain a Bayesian Network $B_{ic}$:

$$B_{ic}: \quad B_{ic} = B_i - PaB_i(X_i) - \sum_{k=1}^{m} PaB_i(X_{ik}),$$

where $PaB_i(X_i)$ is the parent set of node $X_i$ in $B_i$, $PaB_i(X_{ik})$ is the parent set of node $X_{ik}$ in $B_i$.

Step 404: A sequence is determined for the nodes in node set A arbitrarily.

Step 405: Legitimate parent sets are selected for each node in node set A.

Here, a legitimate parent set is a node set, which, when added to the Bayesian Network $B_{ic}$, makes the Bayesian Network $B_{ic}$ form a Directed Acyclic Graph (DAG). A legitimate parent set can be a null set.

Step 406: The probabilities that each node in node set A gives the legitimate parent sets selected for the node are calculated from the records of the variables corresponding to the nodes.

Supposing that the collection of all legitimate parent sets selected for node $X_i$ in step 405 is $\Omega B(X_i) = \{Pa(X_i)_1, Pa(X_i)_2, \ldots, Pa(X_i)_M\}$, the probability $P(Pa(X_i)_j)$ that the node $X_i$ gives a parent set $Pa(X_i)_j$ (j=1, 2, ..., M) will be:

$$P(Pa(X_i)_j) = \frac{f(Pa(X_i)_j)}{\sum_{k=1}^{M} f(Pa(X_i)_k)} \quad (3)$$

where $X_i$ is the current node, $Pa(X_i)$ j is the $j^{th}$ parent set selected for current node $X_i$ (j is an integer and $1 \leq j \leq M$), $P(Pa(X_i)_j)$ is the probability that the current node X gives the parent set $Pa(X_i)_j$, f(x) is a monotone increasing function in the first quadrant, and $x=Pa(X_i)_j$ or $Pa(X_i)_k$, M is the total number of parent sets selected for the current node $X_i$ in step 405, and k is an integer.

$P(Pa(X_i)_j)$ can also be represented with the following expression:

$$P(Pa(X_i)_j) = \frac{P(X_i | Pa(X_i)_j)^T}{\sum_{k=1}^{M} P(X_i | Pa(X_i)_k)^T} \quad (4)$$

where $P(X_i|Pa(X_i)_j)$ is the conditional probability of node $X_i$ to node $Pa(X_i)_j$, $P(X_i|Pa(X_i)_k)$ is the conditional probability of node $X_i$ to node $Pa(X_i)_k$, and T is a rational number; or:

$$P(Pa(X_i)_j) = \frac{\log(P(X_i | Pa(X_i)_j)) + C}{\sum_{k=1}^{M} (\log(P(X_i | Pa(X_i)_k)) + C)} \quad (5)$$

where C is a rational number.

Step 407: The parent set is selected for each node with an importance sampling method, in accordance with the probabilities that the nodes gives the legitimate parent sets selected for the nodes.

The importance sampling method is to: perform sampling randomly, but focus on sampling points with higher probabilities. In actual applications, for a node in node set A, after the probabilities that the node gives the parent sets selected for the node is calculated in Step 406, the exact parent set of the node can be determined by producing a random number and then determining in accordance with the range of the random number.

Step 408: The parent sets determined for the nodes in node set A are added into the original Bayesian Network $B_{ic}$, to obtain Bayesian Network $B_{it}$.

Step 409: It is judged whether the obtained Bayesian Network $B_{it}$ meets the criterion of acceptance; if the Bayesian Network meets the criterion of acceptance, Step 410 is performed; otherwise, Step 411 is performed.

Specifically, whether the obtained Bayesian Network B, meets the criterion of acceptance can be judged as follows:

Method 1: the Metropolis-hasting method based on Markov Chain Monte Carlo (MCMC), a simplified expression of the method is as follows:

$$A(B_i, B_{it}) = \min\left(1, \frac{f(P(B_{it} | D))Q(B_i | B_{it})}{f(P(B_i | D))Q(B_{it} | B_i)}\right) \quad (6)$$

where $A(B_i, B_{it})$ is the probability of acceptance; $f(x)$ is a monotone increasing function in the first quadrant, and $x=P(B_{it}|D)$ or $P(B_i|D)$; $P(B_{it}|D)$ is the conditional probability of $B_{it}$ to D; $P(B_i|D)$ is the conditional probability of $B_i$ to D; $Q(B_{it}|B_i)$ is the proposal probability of $B_{it}$ to $B_i$; $Q(B_i|B_{it})$ is the proposal probability of $B_i$ to $B_{it}$; D is the record of the variable.

If the proposal probability is not taken into account, i.e., the part $$\frac{Q(B_i \mid B_{it})}{Q(B_{it} \mid B_i)}$$

is removed, then the expression can be further simplified as:

$$A(B_i, B_{it}) = \min\left(1, \frac{f(P(B_{it} \mid D))}{f(P(B_i \mid D))}\right) \quad (7)$$

If $A(B_i, B_{it})$ is within the predefined range, $B_{it}$ is acceptable; otherwise, $B_{it}$ shall be discarded.

Method 2: the temperature probability method in the simulated annealing process.

Method 3: It is judged whether the joint probability of the obtained Bayesian Network is higher than the predefined probability.

Step 410: The Bayesian Network $B_{it}$ is retained, and the condition $B_{i+1}=B_{it}$ is set, and then the process turns to Step 412.

Step 411: The Bayesian Network $B_{it}$ is discarded, the condition $B_{i+1}=B_i$ is set, and then the process turns to Step 412.

Step 412: It is judged whether the criterion for stopping the loop is met; if the criterion is met, Step 414 is performed; otherwise, Step 413 is performed.

The criterion for stopping the loop can be: the Bayesian Network has been constructed for a duration longer than the predefined duration, or the joint probability of the current Bayesian Network is equal to the predefined joint probability, or the result-feature probability of the current Bayesian Network is lower than the predefined result-feature probability, or the joint probabilities of the Bayesian Networks obtained in the predefined duration do not exhibit an increasing trend, or the joint probabilities of the Bayesian Networks obtained in the predefined duration are lower than the predefined value, or the result-feature probabilities of the Bayesian Networks obtained in the predefined duration do not exhibit an increasing trend, etc.

The calculating formula of result-feature probability is shown in expression (2).

Step 413: The condition $i=i+1$ is set, and the process returns to Step 403.

Step 414: The optimal Bayesian Network is determined from all Bayesian Networks retained.

The result-feature probabilities of all Bayesian Networks retained can be calculated, and then the optimal Bayesian Network can be determined in accordance with the result-feature probabilities; or, the joint probabilities of the Bayesian Network retained can be calculated, and the Bayesian Network with the highest joint probability can be determined as the optimal Bayesian Network.

If there are more than one Bayesian Networks that have the highest joint probability, the optimal Bayesian Network can be determined as any of the Bayesian Networks or any combination of the Bayesian Networks.

Figure 5:
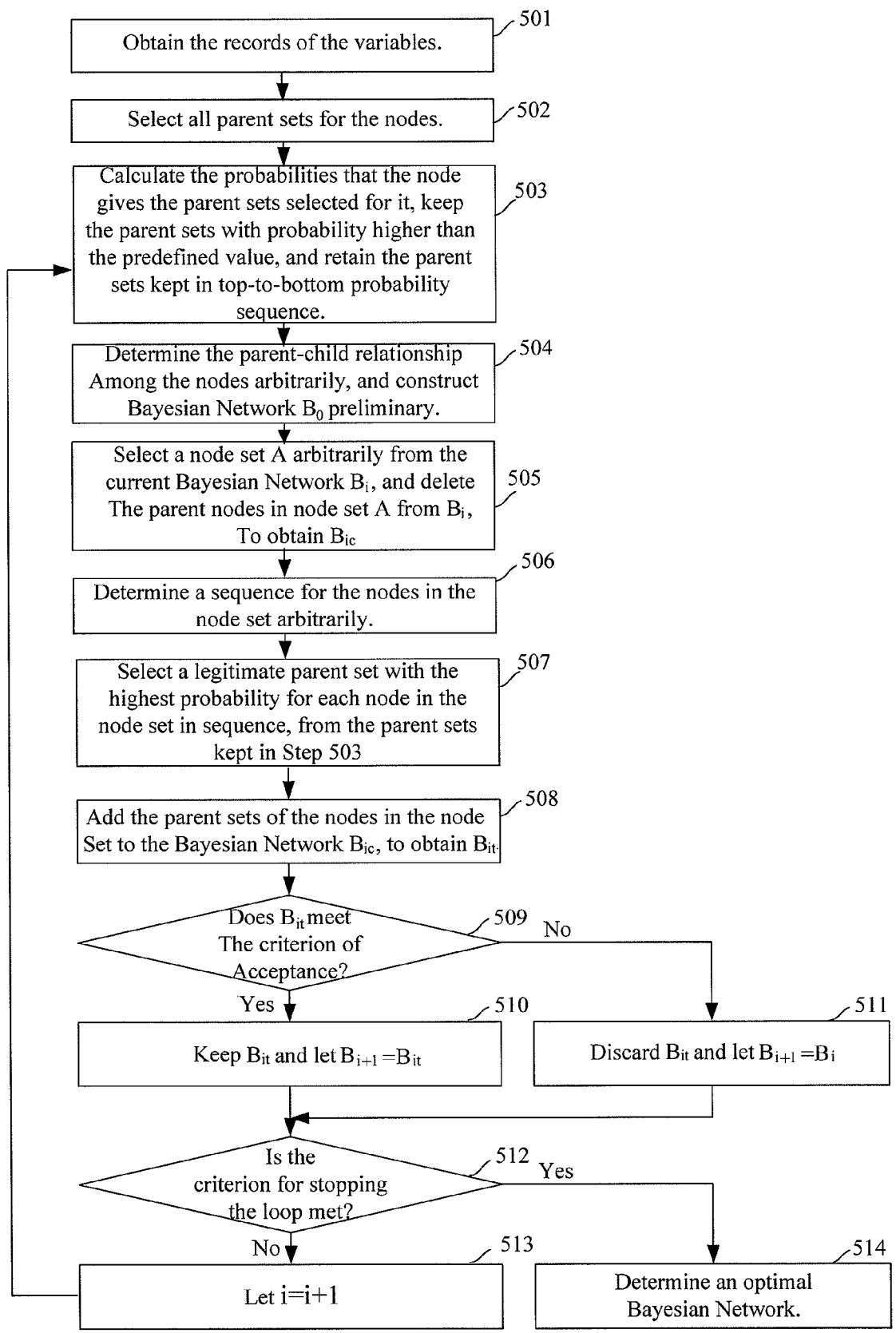
FIG. 5 is a flow diagram of embodiment 2 of the method for establishing a Bayesian Network in the present invention.

FIG. 5 is a flow diagram of embodiment 2 of the method for establishing a Bayesian Network in the present invention; as shown in FIG. 5, the steps are as follows:

Step 501: The records of the variables are obtained.

Step 502: Each variable is set to correspond to a node, and all parent sets are selected for each of the nodes.

The parent sets selected for each node can be legitimate parent sets or illegitimate parent sets.

Step 503: The probabilities that each node gives the parent sets selected for the node are calculated, all parent sets with probability higher than the predefined value are retained, and the parent sets kept for each node in top-to-bottom probability sequence are saved.

Step 504: The parent-child relationship among the nodes arbitrarily is determined, and then a Bayesian Network $B_0$ is preliminarily constructed in accordance with the parent-child relationship among the nodes arbitrarily.

Step 505: A node set A is selected from the current Bayesian Network $B_i$ (i is an integer and $i \geqq 0$), and the parent nodes of the nodes in node set A are deleted from $B_i$, to thereby obtain a Bayesian Network $B_{ic}$.

Step 506: A sequence is determined for the nodes in node set A arbitrarily.

Step 507: A legitimate parent set with the highest probability selected for each node in node set A in sequence, in accordance with the parent sets kept for each node in Step 503.

For example, for node X in node set A, first, take the first parent set (i.e., the parent set with the highest probability) from the parent sets kept for node $X_i$ in Step 503; if a Directed Acyclic Graph (DAG) can be obtained after the parent set is added to $B_{ic}$, then take the first parent set as the parent set of node $X_i$; otherwise, take the second parent set from the parent sets kept for node $X_i$ in Step 503; if a Directed Acyclic Graph (DAG) can be obtained after the parent set is added to $B_{ic}$, then take the second parent set as the parent set of node $X_i$; otherwise, take the third parent set from the parent sets kept for node $X_i$ in Step 503, and so on.

The method for selecting the parent set for a node described in Step 507 is the highest probability selection method.

Step 508: The parent sets determined for the nodes in node set A are added to the original Bayesian Network $B_{ic}$, to thereby obtain a Bayesian Network $B_{it}$.

Step 509: It is judged whether the obtained Bayesian Network $B_{it}$ meets the criterion of acceptance; if the obtained Bayesian Network meets the criterion, Step 510 is performed; otherwise, Step 511 is performed.

Step 510: The Bayesian Network $B_{it}$ is retained, the condition $B_{i+1}=B_{it}$ is set, and the process turns to Step 512.

Step 511: The Bayesian Network $B_i$ is retained, the condition $B_{i+1}=B_i$ is set, and the process turns to Step 512.

Step 512: It is judged whether the criterion for stopping the loop is met; if the criterion is met, Step 514 is performed; otherwise, Step 513 is performed.

Step 513: The condition $i=i+1$ is set, and the process returns to Step 505.

Step 514: The optimal Bayesian Network is determined from all Bayesian Networks retained.

Hereunder, an example will be described, in order to make the process described in FIG. 4 understood better:

Supposing that there is a variable set $X=\{X_1, X_2, \ldots, X_9\}$, $B_0$ is the Bayesian Network that is produced preliminarily for variable set X, $B_i$ is the $i^{th}$ Bayesian Network that is produced for variable set X and accepted, and $B_{it}$ is a new Bayesian Network produced from Bayesian Network $B_i$.

Step 01: A Bayesian Network $B_0$ is preliminarily constructed for variable set X.

Figure 6:
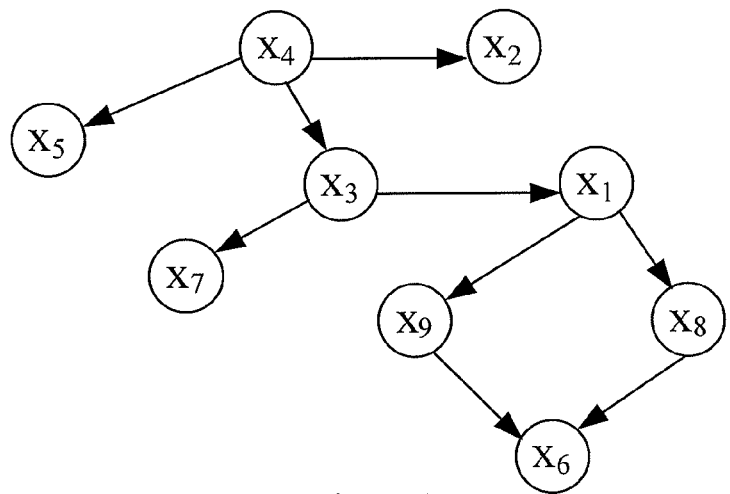
FIG. 6 is a schematic diagram of the Bayesian Network in the method for establishing a Bayesian Network in the present invention.

Step 02: Supposing that the current Bayesian Network $B_i$ is the Bayesian Network shown in FIG. 6, where the parent set of $X_1$ is $\{X_3\}$, the parent set of $X_2$ is $\{X_4\}$, the parent set of $X_3$ is $\{X_4\}$, ..., the parent set of $X_6$ is $\{X_8, X_9\}$, ..., and the parent set of $X_9$ is $\{X_1\}$.

Step 03: A node set is selected from $B_i$ arbitrarily, and new parent sets are selected for the nodes in the node set to produce a new Bayesian Network $B_{it}$ through the following steps:

a. The descendent set of each node in $B_i$ is found out, and the nodes and the descendent sets of the nodes are shown in Table 1:

TABLE 1

Nodes and Descendent Sets of Nodes

| Node | Descendent Set |
| --- | --- |
| $X_1$ | $X_8, X_9, X_6$ |
| $X_2$ | $\phi$ |
| $X_3$ | $X_1, X_8, X_9, X_6$ |
| $X_4$ | $X_2, X_3, X_5, X_1, X_7, X_9, X_8, X_6$ |
| $X_5$ | $\phi$ |
| $X_6$ | $\phi$ |
| $X_7$ | $\phi$ |
| $X_8$ | $X_6$ |
| $X_9$ | $X_6$ | b. A node is selected arbitrarily from the nodes $X_1$, $X_3$, $X_4$, $X_5$, $X_8$ and $X_9$ that have a descendent set, and a subset is selected arbitrarily from the descendent set of the node.

Supposing node $X_1$ is selected, and node $X_8$ and $X_6$ are selected from the descendent set of $X_1$, a node set $A=\{X_1, X_8, X_6\}$ is obtained.

Step 1: The parent sets of node $X_1$, $X_8$ and $X_6$ are deleted from the current Bayesian Network $B_i$, to thereby obtain Bayesian Network $B_{ic}$, the sequence of the three nodes is determined, and it is supposed that a node set $\{X_1, X_8, X_6\}$ is obtained.

Step 2: New legitimate parent sets are selected for $X_1$.

The new parent sets selected for $X_1$ are $\Omega(X_1) = \{\{X_6, X_8\}, \{X_3\}, \{X_3, X_8\} \phi\}$; it can seen that all of the parent sets in $\Omega(X_1)$ will not make the resulting Bayesian Network a cyclic graphic, i.e., all of them are legitimate parent sets.

Step 3: The probabilities that the node $X_1$ gives the parent sets in $\Omega(X_1)$ are calculated in sequence.

The probability that the node $X_1$ gives the parent set $\{X_6, X_8\}$, i.e., the probability $P(\{X_6, X_8\})$ of selecting $\{X_6, X_8\}$ as the parent set of $X_1$ is:

$$P(\{X_6, X_8\}) = \frac{f(P(X_1 \mid \{X_6, X_8\}))}{f(P(X_1 \mid \{X_6, X_8\})) + f(P(X_1 \mid \{X_3\})) + f(P(X_1 \mid \{X_3, X_8\})) + f(P(X_1))}$$

where f(x) is a monotone increasing function in the first quadrant, $x = P(X_1 \mid \{X_6, X_8\})$ or $P(X_1 \mid \{X_3\})$ or $P(X_1 \mid \{X_3, X_8\})$ or $P(X_1)$; $P(X_1 \mid \{X_6, X_8\})$ is the conditional probability of $X_1$ to $\{X_6, X_8\}$, and $P(X_1 \mid \{X_3\})$ and $P(X_1 \mid \{X_3, X_8\})$ have similar meanings as above; $P(X_1)$ is the probability of $X_1$.

The probability $P(\{X_3\})$ that the node $X_1$ gives the parent set $\{X_3\}$ is:

$$P(\{X_3\}) = \frac{f(P(X_1 \mid \{X_3\}))}{f(P(X_1 \mid \{X_6, X_8\})) + f(P(X_1 \mid \{X_3\})) + f(P(X_1 \mid \{X_3, X_8\})) + f(P(X_1))}$$

and so on.

Step 4: The parent set of node $X_1$ with the importance sampling method is determined in accordance with the probabilities that the node $X_1$ gives the parent sets $P(\{X_6, X_8\})$, $P(\{X_3\})$, $P(\{X_3, X_8\})$ and $P(\{\phi\})$ in $\Omega(X_1)$.

For example, supposing that $P(\{X_6, X_8\}) = 0.2$, $P(\{X_3\}) = 0.4$, $P(\{X_3, X_8\}) = 0.1$, and $P(\{\phi\}) = 0.3$, a random number in [0, 1] range can be produced, if the random number is in [0, 0.2] range, $\{X_6, X_8\}$ is selected as the parent node of node $X_1$; if the random number is in [0.2, 0.4] range, $\{X_3\}$ is selected as the parent set of node $X_1$; if the random number is in [0.4, 0.7] range, $\{X_3, X_8\}$ is selected as the parent set of node $X_1$; if the random number is in [0.7, 1.0] range, $\phi$ is selected as the parent set of the node $X_1$.

Supposing that $\{X_6, X_8\}$ is selected as the parent set of $X_1$ finally; add the parent set to the Bayesian Network $B_{ic}$, to obtain a Bayesian Network $B_{it}$: $B_{it} = B_{ic} + \{[X_6, X_1], [X_8, X_1]\}$, where $[X_6, X_1]$ is an edge pointing from node $X_6$ to node $X_1$.

Step 5: New legitimate parent sets are selected for node $X_8$.

The new parent sets selected for node $X_8$ are: $\Omega(X_8) = \{\{X_6\}, \{X_1\}, \{X_1, X_6\}, \phi\}$. As can be seen, if the edge from $X_1$ to $X_8$ is added to the $B_{it}$ obtained in Step 4, the resulting Bayesian Network will form a cyclic graph; therefore, $\{X_1\}$ and $\{X_1, X_6\}$ are not legitimate parent sets, so that $\Omega(X_8) = \{\{X_6\}, \phi\}$.

Step 6: The probabilities that the node $X_8$ gives the parent sets in $\Omega(X_8)$ are calculated, and the parent set of node $X_8$ is determined with the importance sampling method.

The processes are identical to the processes for selecting the parent set for $X_8$.

Supposing that $\{X_6\}$ is selected as the parent set of $X_8$ finally, the $B_{it}$ obtained in Step 4 is updated as follows: $B_{it} = B_{it} + \{[X_6, X_8]\}$.

Step 7: The parent set of $X_6$ is determined.

The processes are identical to the processes for selecting the parent set for $X_1$ or $X_8$.

Supposing that $\{X_2, X_5\}$ is selected as the parent set of $X_6$, the $B_{it}$ obtained in Step 6 is updated as follows: $B_{it} = B_{it} + \{[X_2, X_6], [X_5, X_6]\}$.

Step 8: It is judged whether the probability of acceptance $A(B_i, B_{it})$ of $B_{it}$ is higher than the predefined value; if the probability of acceptance is higher than the predefined value, $B_{it}$ is retained and the condition $B_{i+1} = B_{it}$ is set; otherwise, $B_{it}$ is discarded and the condition $B_{i+1} = B_i$ is set.

Step 04: It is judged whether the criterion for stopping the loop is met; if the criterion is met, the optimal Bayesian Network is determined from all Bayesian Networks retained; otherwise, the condition i=i+1 is set and the process returns to Step 02.

Figure 7:
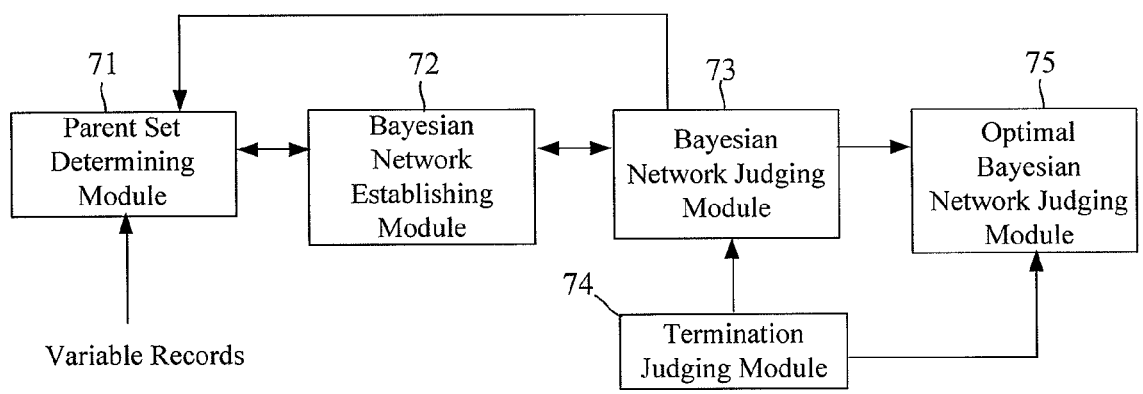
FIG. 7 is a schematic diagram of the apparatus for establishing a Bayesian Network in the present invention.

FIG. 7 is a schematic diagram of the apparatus for establishing a Bayesian Network in the present invention; as shown in FIG. 7, the apparatus mainly includes: a parent set determining module 71, a Bayesian Network establishing module 72, a Bayesian Network judging module 73, a termination judging module 74, and an optimal Bayesian Network determining module 75.

The parent set determining module 71 is configured to receive the variable records from the external input, receive the initial Bayesian Network sent from the Bayesian Network establishing module 72 and the intermediate Bayesian Network sent from the Bayesian Network judging module 73, and, after receiving an indication that indicates the last Bayesian Network is valid from the Bayesian Network judging module 73, take the last retained Bayesian Network as the current Bayesian Network; select partial nodes from the current Bayesian Network, and re-select parent sets for the partial nodes with importance sampling method or the highest probability selection method with the variable records, and output the mapping relationship between the nodes and the parent sets re-selected for the nodes to the Bayesian Network establishing module 72.

The Bayesian Network establishing module 72 is configured to determine the initial Bayesian Network and receive the intermediate Bayesian Network sent from the Bayesian Network judging module 73, delete the parent sets of the nodes sent from the parent set determining module 71 from the current Bayesian Network in accordance with the mapping relationship between the nodes and the parent sets re-selected for the nodes from the parent set determining module 71, add the parent sets re-selected for the nodes from the parent set determining module 71, and then output the obtained Bayesian Network to the Bayesian Network judging module 73.

The Bayesian Network judging module 73 is configured to judge whether to accept the Bayesian Network sent from the Bayesian Network establishing module 72 in accordance with the criterion for acceptance of Bayesian Network stored locally; if the Bayesian Network judging module 73 decides to accept the Bayesian Network and receives no termination instruction from the termination judging module 74, it will output the Bayesian Network to the parent set determining module 71, the Bayesian Network establishing module 72, and the optimal Bayesian Network determining module 75; if the Bayesian Network judging module 73 decides to accept the Bayesian Network and receives a termination instruction from the termination judging module 74, it will output the Bayesian Network only to the Bayesian Network determining module 75; if the Bayesian Network judging module 73 decides to reject the Bayesian Network and receive no termination instruction from the termination judging module 74, it sends an indication that indicates the current Bayesian Network is valid to the parent set determining module 71.

The termination judging module 74 is configured to judge whether the criterion for terminating the Bayesian Network establishing process is met now, if the criterion is met, it sends a termination instruction to the Bayesian Network judging module 73 and the optimal Bayesian Network determining module 75.

The optimal Bayesian Network determining module 75 is configured to receive and retain the Bayesian Network sent from the Bayesian Network judging module 73, and, after receiving a termination instruction from the termination judging module 74, determine the optimal Bayesian Network from all Bayesian Networks stored locally.

The parent set determining module 71 described above can also be referred to as a parent variable set determining module or superior variable set determining module; the Bayesian Network establishing module 72 described above can also be referred to as a variable dependency establishing module; the Bayesian Network judging module 73 described above can also be referred to as a variable dependency judging module; the optimal Bayesian Network determining module 75 described above can also be referred to as an optimal variable dependency determining module.

Bayesian Network are mainly used to:

I. determine the type of the new variable data input with different types of Bayesian Network constructed;

II. determine whether the new variable data input is normal with the Bayesian Networks constructed;

III. determine whether the new variable data input pertains to the type corresponding to a specific type of Bayesian Network constructed;

IV. forecast the values of the variables that are not inputted, in accordance with the Bayesian Network constructed and the partial variable data input.

Figure 8:
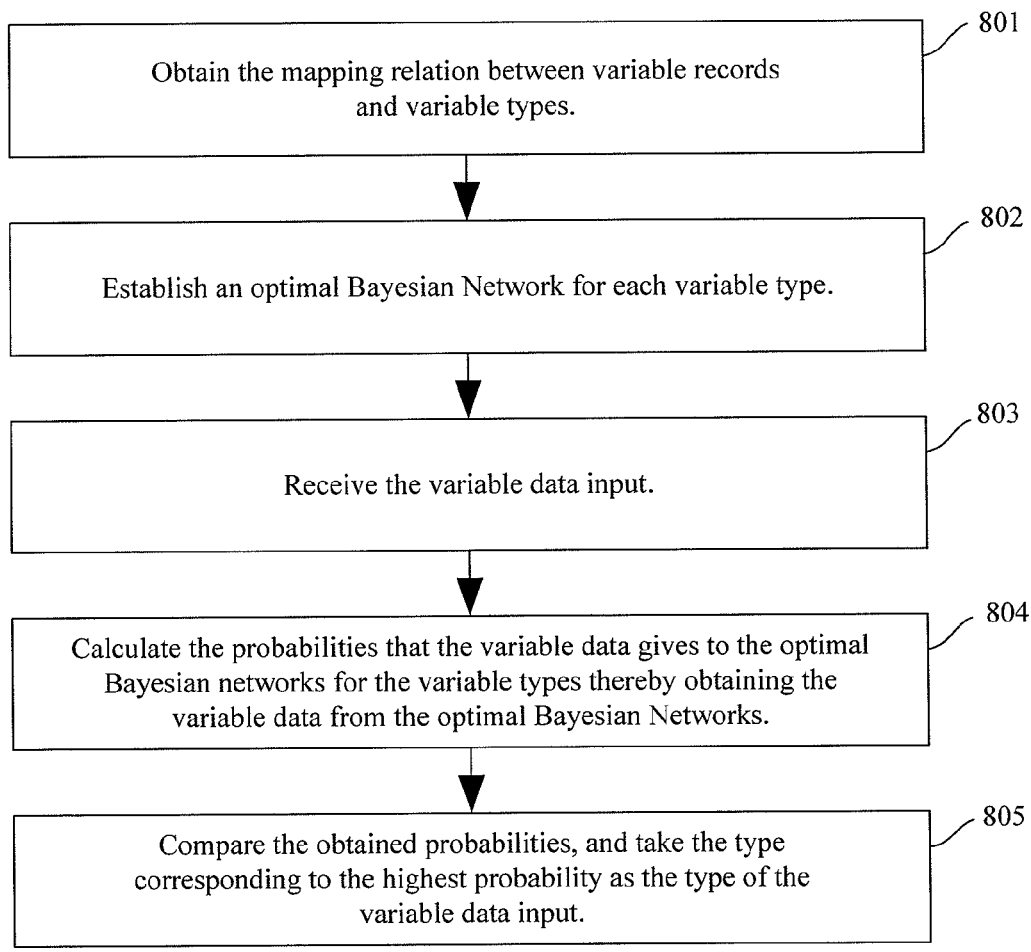
FIG. 8 is a flow diagram of determining the type of the new variable data input with a Bayesian Network in the present invention.

FIG. 8 is a flow diagram of determining the type of the new variable data input with a Bayesian Network in the present invention. As shown in FIG. 8, the steps are as follows:

Step 801: The mapping relationship between variable records and variable types is obtained.

Step 802: A corresponding optimal Bayesian Network is established for each type of variables, in accordance with the variable records.

Step 803: Variable data input is received.

Step 804: The probabilities that the variable data input gives the optimal Bayesian Networks thereby obtaining the variable data from the Bayesian Networks, are calculated.

Step 805: All probabilities obtained in Step 804 are compared, and the type corresponding to the highest probability among the probabilities are taken as the type of the variable data input.

Hereunder, an application example of the process shown in FIG. 8 will be described:

Supposing that there are 8 emails, 4 of them are non-spam emails, and the other 4 are spam emails. Table 2 shows 4 groups of variable records extracted from the 4 non-spam emails: number of occurrence of "Meditation," number of occurrence of "Roaming," number of occurrence of "Busy," and number of occurrence of "Weekend"; Table 3 shows 4 groups of records extracted from the 4 spam emails: number of occurrence of "Meditation," number of occurrence of "Roaming," number of occurrence of "Busy," and number of occurrence of "Weekend."

TABLE 2

| | Variable Records of Non-Spam Emails | | | |
| --- | --- | --- | --- | --- |
| | Variable | | | |
| Variable Record | Number of Occurrence of "Meditation" | Number of Occurrence of "Roaming" | Number of Occurrence of "Busy" | Number of Occurrence of "Weekend" |
| Record Group 1 | 2 | 0 | 5 | 3 |
| Record Group 2 | 1 | 1 | 0 | 1 |
| Record Group 3 | 0 | 0 | 4 | 2 |
| Record Group 4 | 1 | 1 | 3 | 0 |

TABLE 3

Record Data of Spam Emails

| | Variable | | | |
|---|---|---|---|---|
| Variable Record | Number of Occurrence of "Meditation" | Number of Occurrence of "Roaming" | Number of Occurrence of "Busy" | Number of Occurrence of "Weekend" |
| Record Group 1 | 1 | 0 | 1 | 0 |
| Record Group 2 | 2 | 0 | 0 | 2 |
| Record Group 3 | 0 | 0 | 1 | 0 |
| Record Group 4 | 1 | 1 | 0 | 0 |

Figure 9:
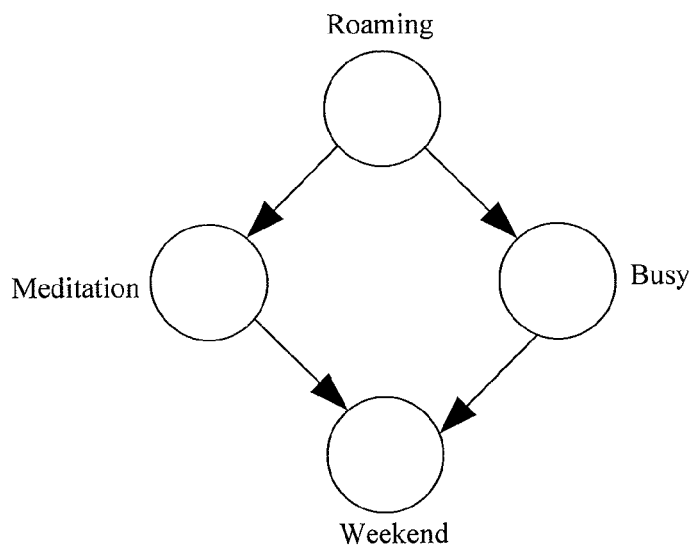
FIG. 9 is a schematic diagram of the Bayesian Network for non-spam emails in an embodiment of determining the type of the new variable data input with a Bayesian Network in the present invention.
Figure 10:
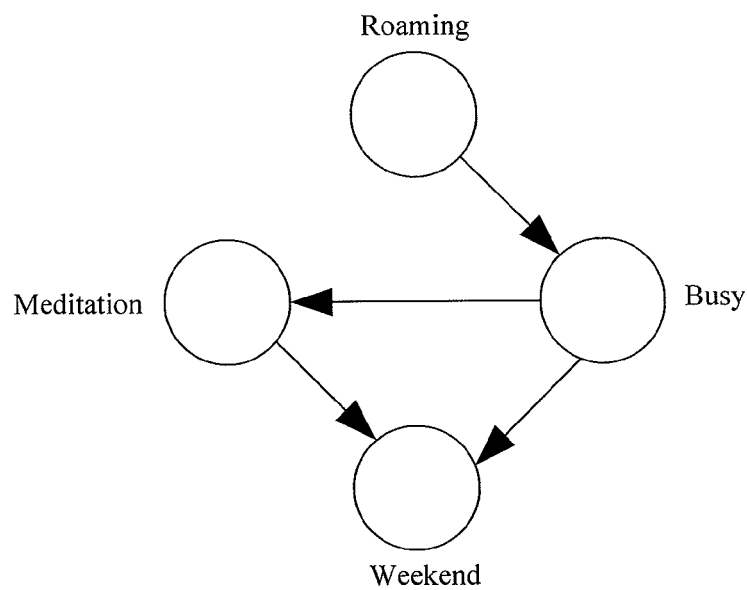
FIG. 10 is a schematic diagram of the Bayesian Network for spam emails in an embodiment of determining the type of the new variable data input with a Bayesian Network in the present invention.

Supposing that the optimal Bayesian Network $B_1$ for non-spam emails established in accordance with the process shown in FIG. 4 or FIG. 5 and the variable data of non-spam emails is the Bayesian Network shown in FIG. 9; for the convenience of description, hereunder the nodes Meditation, Roaming, Busy, and Weekend shown in FIG. 9 represent the number of occurrence of "Meditation," the number of occurrence of "Roaming," the number of occurrence of "Busy," and the number of occurrence of "Weekend," respectively; supposing that the optimal Bayesian Network $B_2$ for spam emails established in accordance with the process shown in FIG. 4 or FIG. 5 and the variable records of spam emails is the Bayesian Network shown in FIG. 10, and, similarly, the nodes Meditation, Roaming, Busy, and Weekend shown in FIG. 10 represent the number of occurrence of "Meditation," the number of occurrence of "Roaming," the number of occurrence of "Busy," and the number of occurrence of "Weekend," respectively.

Now, a new email is received, and the data corresponding to the variables in the new email is: number of occurrence of "Meditation": 1; number of occurrence of "Roaming": 0; number of occurrence of "Busy": 2; number of occurrence of "Weekend": 0; then, whether the new email is a spam email or a non-spam email can be judged through the following steps:

01: The probability $P_{B_1}$ that the variable data in the new email gives the optimal Bayesian Network $B_1$ for non-spam emails thereby obtaining the variable data, is calculated as follows:

$P_{B_1}$=P(number of occurrence of "Roaming"=0)*P(number of occurrence of "Meditation"=1|number of occurrence of "Roaming"=0)*P(number of occurrence of "Busy"=2|number of occurrence of "Roaming"=0)*P(number of occurrence of "Weekend"=0|number of occurrence of "Meditation"=0, number of occurrence of "Busy"=2);

02: The probability $P_{B_2}$ that the variable data in the new email gives the optimal Bayesian Network $B_2$ for spam emails thereby obtaining the variable data, is calculated as follows:

$P_{B_2}$=P(number of occurrence of "Roaming"=0)*P(number of occurrence of "Busy"=2|number of occurrence of "Roaming"=0)*P(number of occurrence of "Meditation"=1|number of occurrence of "Busy"=2)*P(number of occurrence of "Weekend"=0|number of occurrence of "Meditation"=1, number of occurrence of "Busy"=2);

03: It is judged whether $P_{B_1} > P_{B_2}$ is true; if $P_{B_1} > P_{B_2}$ is true, the new email is a non-spam email; otherwise, the new email is a spam email.

Figure 11:
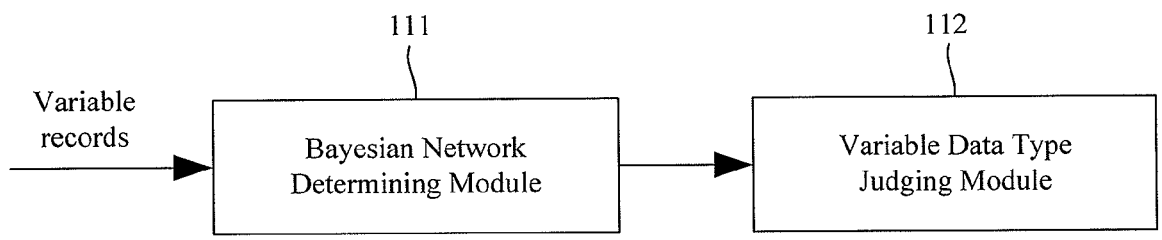
FIG. 11 is a schematic diagram of the apparatus for determining the type of the new variable data input with a Bayesian Network in the present invention.

FIG. 11 is a schematic diagram of the apparatus for determining the type of the new variable data input with a Bayesian Network in the present invention. As shown in FIG. 11, the apparatus mainly includes:

a Bayesian Network determining module 111, configured to receive the variable records from the external input, establish an optimal Bayesian Network for each type of the variables, and output the mapping relationship between variable types and optimal Bayesian Networks to a variable data type judging module 112;

the Bayesian Network determining module 111 here is the apparatus shown in FIG. 7, where the module that receives the variable records is the parent set determining module 71 shown in FIG. 7, and the module that outputs the mapping relationship between variable types and optimal Bayesian Networks is the optimal Bayesian Network determining module 75 shown in FIG. 7;

the Bayesian Network determining module 111 here is also referred to as a variable dependency determining module; and a variable data type judging module 112, configured to receive the variable data from the external input and the mapping relationship between variable types and optimal Bayesian Networks from the Bayesian Network determining module 111, calculate probabilities that the variable data gives the optimal Bayesian Networks thereby obtaining the variable data, and take the type corresponding to the highest probability as the type of the variable data input.

Figure 12:
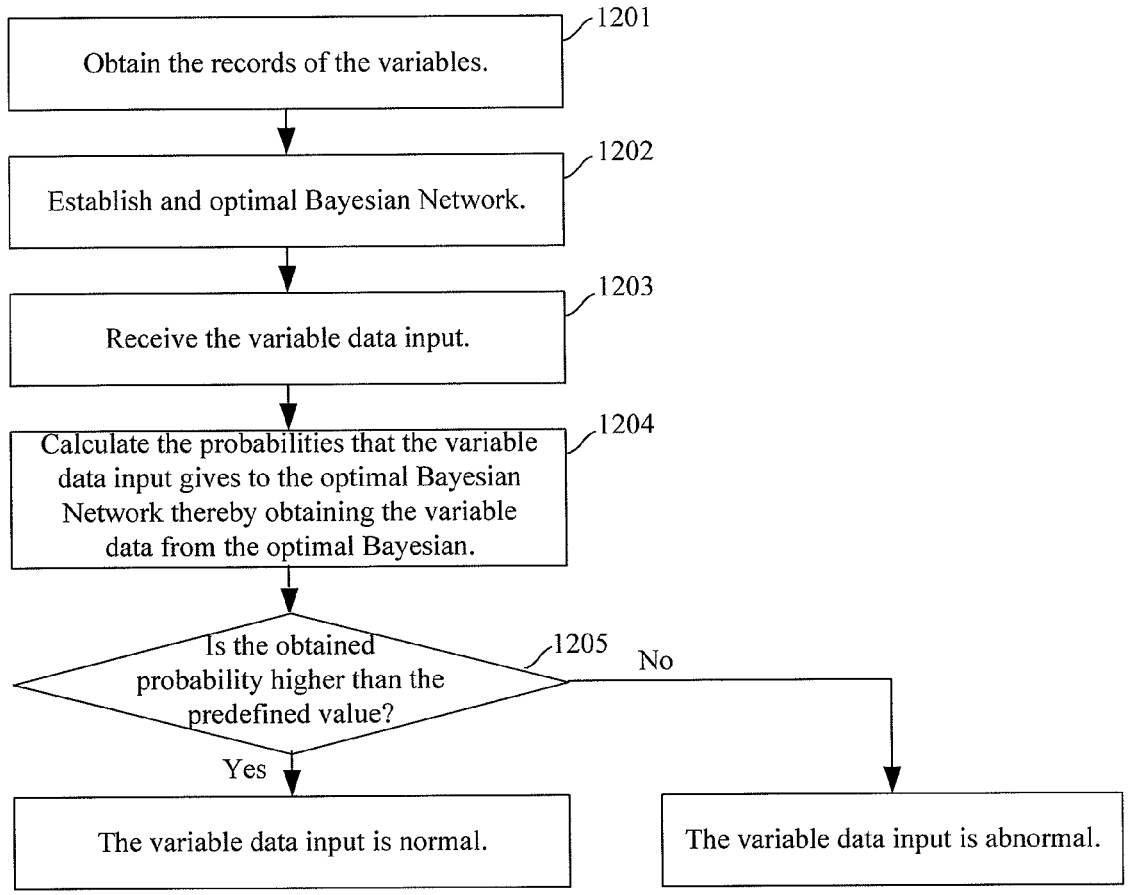
FIG. 12 is a flow diagram of determining whether the new variable data input is normal with a Bayesian Network in the present invention.

FIG. 12 is a flow diagram of determining whether the new variable data input is normal with a Bayesian Network in the present invention; as shown in FIG. 12, the steps are as follows:

Step 1201: The records of the variables are obtained.

Step 1202: An optimal Bayesian Network is obtained in accordance with the variable records.

Step 1203: Variable data input is received.

Step 1204: The probabilities that the variable data input gives the optimal Bayesian Network thereby obtaining the variable data from the Bayesian Network, is calculated.

Step 1205: It is judged whether the probability obtained in Step 1204 is higher than the predefined value; if the probability is higher than the predefined value, the variable data input is normal; otherwise, the variable data input is abnormal.

Figure 13:
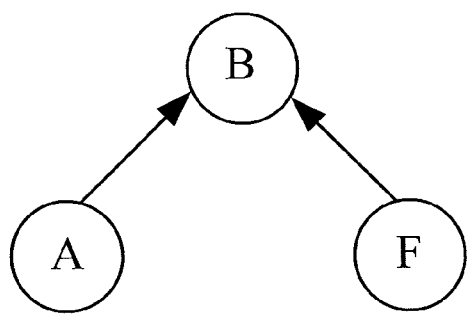
FIG. 13 is a schematic diagram of the Bayesian Network for gene expression data in an embodiment of determining whether the new variable data input is normal with a Bayesian Network in the present invention.

Hereunder, an application example of the process shown in FIG. 12 will be described:

Supposing that there are three genes: gene A, gene B, and gene F. Now, a group of expression data is abstracted for each gene at different times in normal state, and the optimal Bayesian Network established with the expression data of gene A, B, and F through the process shown in FIG. 4 or FIG. 5 is shown in FIG. 13; as shown in FIG. 13, node A corresponds to the expression data of gene A, node B corresponds to the expression data of gene B, and node F corresponds to the expression data of gene F.

Now, a new group of gene expression data is received: the expression data of gene A: 0.2; the expression data of gene B: 0.4; the expression data of gene F: 1.1; whether the gene expression data is normal can be judged through the following steps, and thereby whether the genes are normal can be judged.

01: The probability $P_1$ that the expression data of gene A is calculated: 0.2 gives the optimal Bayesian Network thereby obtaining the expression data from the Bayesian Network:

$P_1$=P (Expression data of gene A=0.2);

02: It is judged whether $P_1$ is in the normal value range; if $P_1$ is in the normal value range, the expression data of gene A is normal, and thereby gene A is normal; otherwise, gene A is abnormal.

03: The probability $P_2$ that the expression data of gene B is calculated: 0.4 gives the optimal Bayesian Network thereby obtaining the expression data from the Bayesian Network:

$P_2$=P(expression data of gene B=0.4|expression data of gene A=0.2, expression data of gene F=1.1);

04: It is judged whether $P_2$ is in the normal value range; if $P_2$ is in the normal value range, gene B is normal; otherwise, gene B is abnormal.

05: The possibility $P_3$ that the expression data of gene F is calculated: 1.1 gives the optimal Bayesian Network thereby obtaining the expression data from the Bayesian Network:

$P_3$=P (expression data of gene F=1.1);

06: It is judged whether $P_3$ is in the normal value range; if $P_3$ is in the normal value range, gene F is normal; otherwise, gene F is abnormal.

Figure 14:
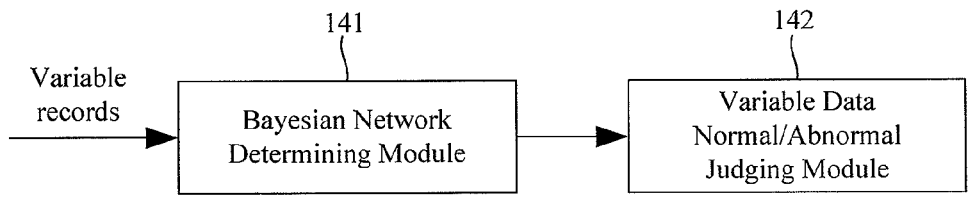
FIG. 14 is a schematic diagram of the apparatus for determining whether the new variable data input is normal with a Bayesian Network in the present invention.

FIG. 14 is a schematic diagram of the apparatus for determining whether the new variable data input is normal with a Bayesian Network in the present invention. As shown in FIG. 14, the apparatus mainly includes:

a Bayesian Network determining module 141, configured to receive the variable records, establish an optimal Bayesian Network in accordance with the variable records, and output the optimal Bayesian Network to a variable data normal/abnormal judging module 142;

the Bayesian Network determining module 141 here being the apparatus shown in FIG. 7, where the module that receives the variable records is the parent set determining module 71 shown in FIG. 7, and the module that outputs the optimal Bayesian Networks is the optimal Bayesian Network determining module 75 shown in FIG. 7;

the Bayesian Network determining module 141 here is also referred to as a variable dependency determining module; and a variable data normal/abnormal judging module 142, configured to receive the variable data from the external input and the optimal Bayesian Network from the Bayesian Network determining module 141, calculate the probability that the variable data input gives the optimal Bayesian Network thereby obtaining the variable data, and judge whether the probability obtained in the calculation is higher than the predefined value; if the probability obtained in the calculation is higher than the predefined value, decide the variable data input is normal; otherwise decide the variable data input is abnormal.

Figure 15:
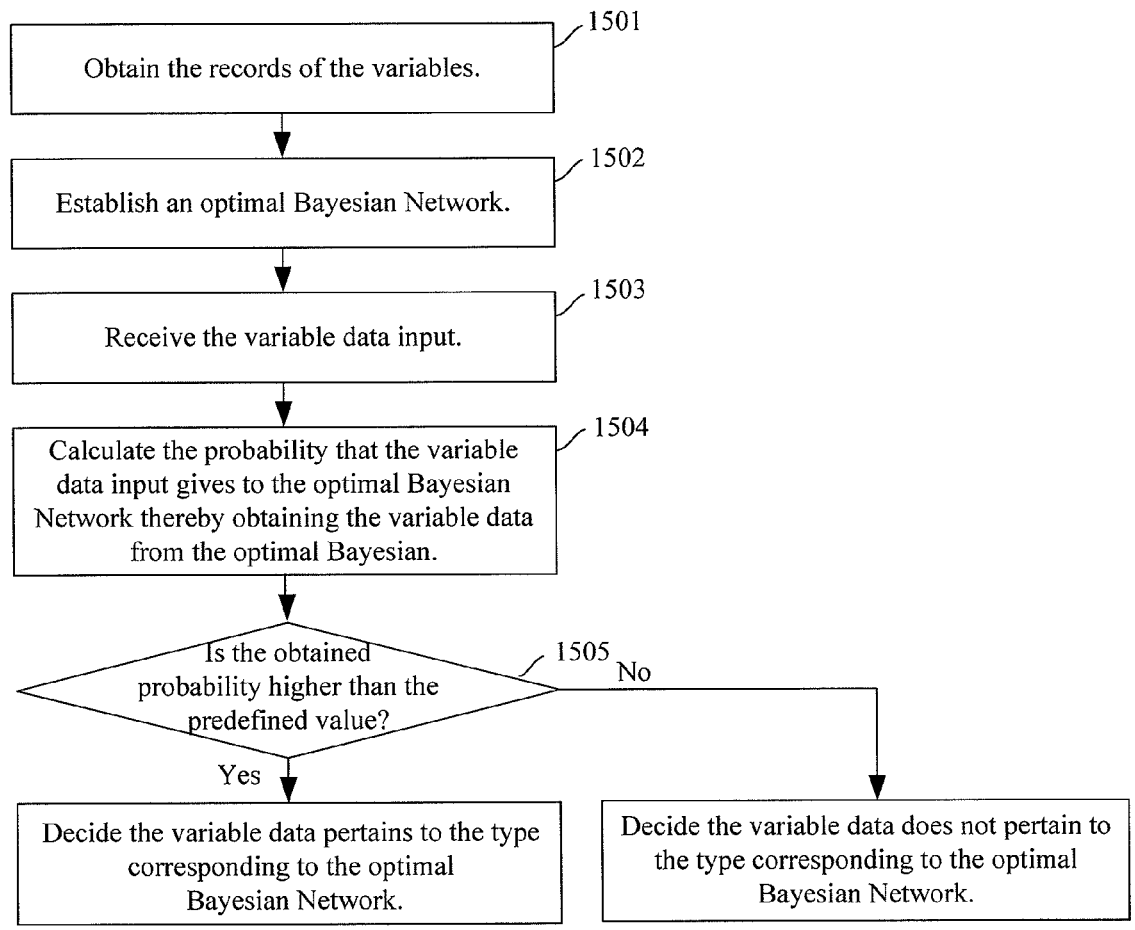
FIG. 15 is a flow diagram of determining whether the new variable data input pertains to a specific type with a Bayesian Network in the present invention.

FIG. 15 is a flow diagram of determining whether the new variable data input pertains to a specific type with a Bayesian Network in the present invention. As shown in FIG. 15, the steps are as follows:

Steps 1501-1504 are identical to Steps 1201-1204.

Step 1505: It is judged whether the probability obtained in Step 1504 is higher than the predefined value; if the probability is higher than the predefined value, the variable data input pertains to the type corresponding to the optimal Bayesian Network; otherwise, the variable data input does not pertain to the type corresponding to the optimal Bayesian Network.

Figure 16:
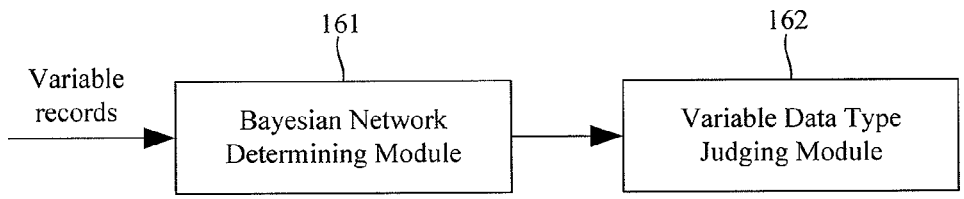
FIG. 16 is a schematic diagram of the apparatus for determining whether the new variable data input pertains to a specific type with a Bayesian Network in the present invention.

FIG. 16 is a schematic diagram of the apparatus for determining whether the new variable data input pertains to a specific type with a Bayesian Network in the present invention. As shown in FIG. 16, the apparatus mainly includes:

a Bayesian Network determining module 161, configured to receive the variable records, establish an optimal Bayesian Network in accordance with the variable records, and output the optimal Bayesian Network to a variable data type judging module 162;

the Bayesian Network determining module 161 here being identical to the Bayesian Network determining module 141 shown in FIG. 14, and being also referred to as a variable dependency determining module; and a variable data type judging module 162, configured to receive the variable data from the external input and the optimal Bayesian Network from the Bayesian Network determining module 161, calculate the probability that the variable data input gives the optimal Bayesian Network thereby obtaining the variable data, and judges whether the probability obtained in the calculation is higher than the predefined value; if the probability is higher than the predefined value, decide the variable data input pertains to the type corresponding to the optimal Bayesian Network; otherwise, decide the variable data input does not pertain to the type corresponding to the optimal Bayesian Network.

Figure 17:
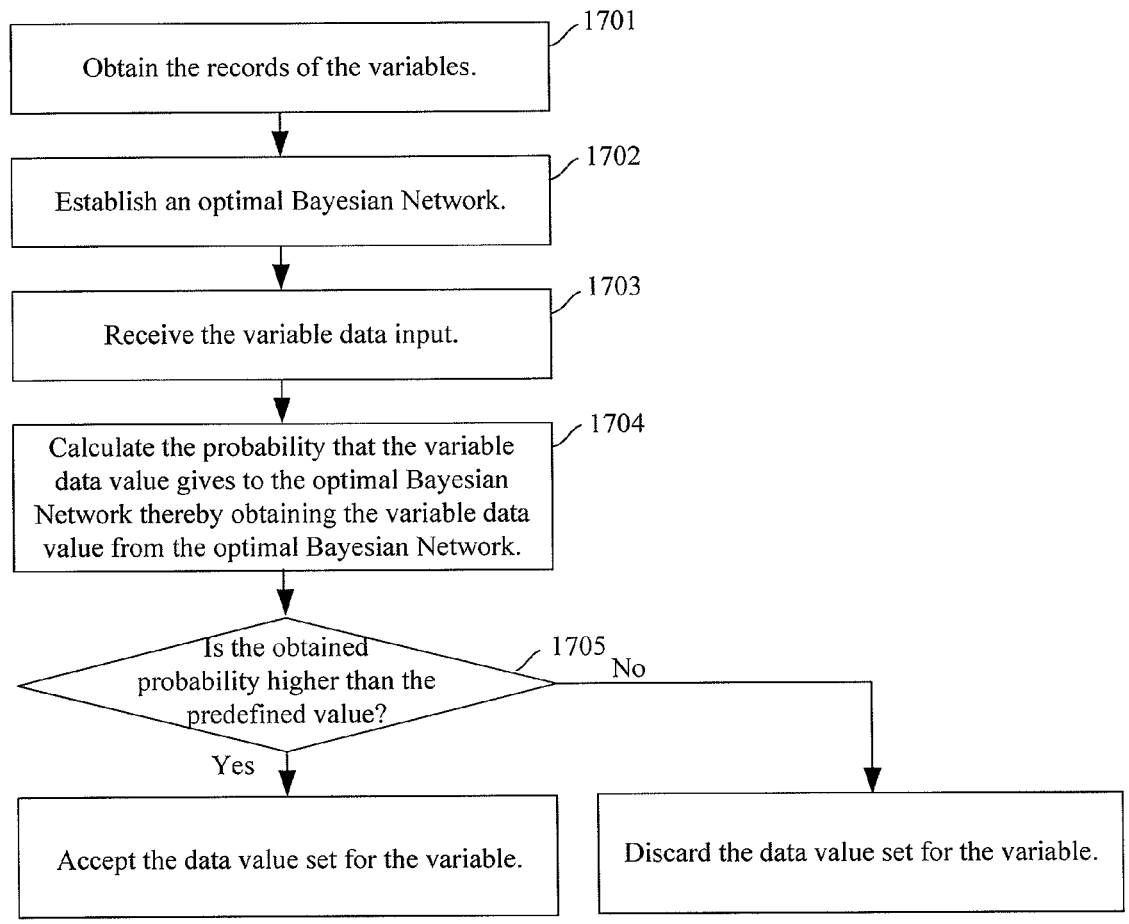
FIG. 17 is a flow diagram of forecasting the values of variables that are not inputted with a Bayesian Network and the data input of partial variables in the present invention.

FIG. 17 is a flow diagram of forecasting the data values of variables that are not inputted with a Bayesian Network and partial data input in the present invention; as shown in FIG. 17, the steps are as follows:

Steps 1701-1703 are identical to steps 1201-1203.

Step 1704: A data value is set for the variable without data input.

Step 1705: The probability that the data value set for the variable gives the optimal Bayesian Network thereby obtaining the data value of the variable from the Bayesian Network, is calculated.

Step 1706: It is judged whether the probability obtained in Step 1705 is higher than the predefined value; if the probability is higher than the predefined value, the data value set for the variable is accepted; otherwise, the data value set for the variable is discarded.

Hereunder, an application example of the process shown in FIG. 17 will be described:

Supposing that there are multiple users who use the records of a variety of services, as shown in Table 4, data="1" represents the service is used; data="0" represents the service is not used.

TABLE 4

Data Sheet of Variable Record vs. Services

| Variable Record Data | Variable | | | | | |
|---|---|---|---|---|---|---|
| | Whether color ring back tone service is used | Whether short message service is used | Whether IPTV service is used | Whether navigation service is used | Whether Podcast service is used | Whether Jest service is used |
| Record group 1 | 1 | 1 | 0 | 0 | 1 | 1 |
| Record group 2 | 0 | 1 | 1 | 0 | 0 | 1 |
| Record group 3 | 1 | 1 | 0 | 1 | 1 | 1 |

TABLE 4-continued

Data Sheet of Variable Record vs. Services

| Variable Record Data | Variable | | | | | |
|---|---|---|---|---|---|---|
| | Whether color ring back tone service is used | Whether short message service is used | Whether IPTV service is used | Whether navigation service is used | Whether Podcast service is used | Whether Jest service is used |
| Record group 4 | 1 | 1 | 0 | 0 | 0 | 0 |
| Record group 5 | 0 | 0 | 0 | 1 | 1 | 1 |

Figure 18:
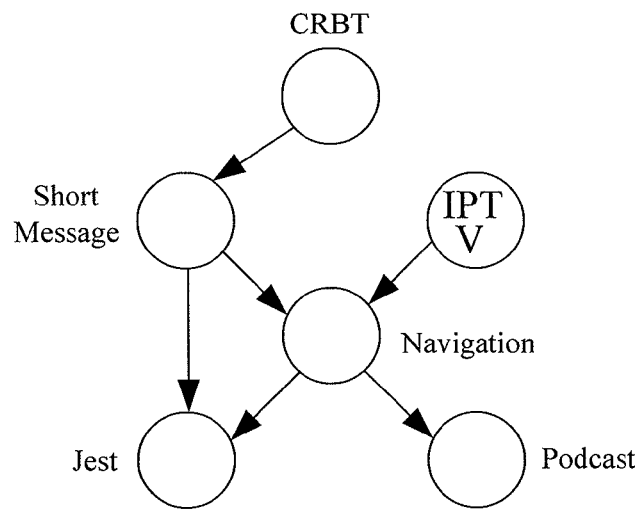
FIG. 18 is a schematic diagram of the Bayesian Network of user services in the method for forecasting the values of variables that are not inputted with a Bayesian Network and the data input of partial variables in the present invention.

Supposing that the optimal Bayesian Network established in accordance with the variable records shown in Table 4 through the process shown in FIG. 4 or FIG. 5 is the Bayesian Network shown in FIG. 18; for the convenience of description, in FIG. 18, let node CRBT correspond to the variable: whether color ring back tone service (CRBT) is used, node Short Message corresponds to the variable: whether short message service is used, and so on for other nodes.

Supposing that the information on a user uses short message service and navigation service is received, i.e. the variable data: whether the short message service is used=1, and whether the navigation service is used=1; then, whether the user uses "Jest" service can be forecast through the following steps:

01: The probability P that the Jest service gives the optimal Bayesian Network thereby obtaining the Jesting service from the optimal Bayesian Network when the Short Message service and Navigation service are used, is calculated:

$P=P(\text{Jest service}=1|\text{Short Message service}=1, \text{Navigation service}=1)$;

02: It is judged whether P is higher than the predefined value; if P is higher than the predefined value, the user will use the Jest service, and thereby the operation can propose the Jest service to the user; otherwise, the user will not use the Jest service.

Figure 19:
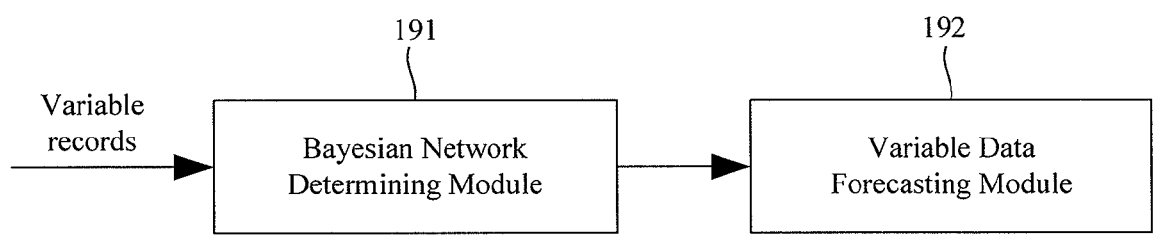
FIG. 19 is a schematic diagram of the apparatus for forecasting the values of variables that are not inputted with a Bayesian Network in the present invention.

FIG. 19 is a schematic diagram of the apparatus for forecasting the data values of variables that are not inputted with a Bayesian Network in the present invention. As shown in FIG. 19, the apparatus mainly includes:

a Bayesian Network determining module 191, configured to receive the variable records, establish an optimal Bayesian Network in accordance with the variable records, and output the optimal Bayesian Network to a variable data forecasting module 192;

the Bayesian Network determining module 191 here being identical to the Bayesian Network determining module 141 shown in FIG. 14, and being also referred to as a variable dependency determining module; and a variable data forecasting module 192, configured to receive the variable data from the external input and the optimal Bayesian Network from the Bayesian Network determining module 191, determine a data value for the variable that is included in the optimal Bayesian Network but without any data input, calculate the probability that the variable data gives the optimal Bayesian Network thereby obtaining the variable data from the optimal Bayesian Network, and judge whether the probability obtained in the calculation is higher than the predefined value; if the probability is higher than the predefined value, accept the data value set for the variable; otherwise reject the data value set for the variable.

While the present invention has been illustrated and described with reference to some exemplary embodiments, the present invention is not limited to these. Those skilled in the art should recognize that various variations and modifications can be made without departing from the spirit and scope of the present invention as defined by the accompanying claims.

What is claimed is:

1. A method for determining variable dependency, comprising:
   A. determining initial variable dependency among variables arbitrarily; selecting partial variables from the variables, and deleting superior variables of the partial variables from a recent variable dependency;
   B. selecting a legitimate superior variable set from all variables for each of the partial variables respectively with records of the variables, and obtaining a new variable dependency; judging whether to accept the new variable dependency; if the new variable dependency is acceptable, storing the new variable dependency and performing Step C; otherwise, performing Step C directly; and
   C. judging whether a criterion for stopping a loop is met; if the criterion is met, determining an optimal variable dependency from all of the stored variable dependencies; otherwise returning to Step A to select partial variables.

2. The method according to claim 1, wherein the process of selecting partial variables from all variables in Step A comprises:
   selecting a variable with subordinate variables in accordance with the initial variable dependency, selecting partial subordinate variables from the subordinate variables of the selected variable, and taking the variable with subordinate variables and the selected partial subordinate variables as the final partial variables selected.

3. The method according to claim 1, wherein whether to accept the new variable dependency in Step B is judged with the Metropolis-hasting method based on Markov Chain Monte Carlo (MCMC).

4. The method according to claim 1, wherein whether to accept the new variable dependency in Step B is judged with the temperature probability method in the simulated annealing process.

5. The method according to claim 1, wherein the process of judging whether to accept the new variable dependency in Step B comprises: judging whether the joint probability of the new variable dependency is higher than the predefined value.

6. The method according to claim 1, wherein the process of determining the optimal variable dependency from all of the stored variable dependencies in Step C comprises: calculating the result-feature probabilities for all of the stored variable dependencies, and determining the optimal variable dependency from the result-feature probabilities.

7. The method according to claim 1, wherein the process of determining the optimal variable dependency from all of the stored variable dependencies in Step C comprises: calculating the joint probabilities of all of the stored variable dependencies, and taking the variable dependency corresponding to the highest joint probability as the optimal variable dependency.

8. The method according to claim 1, wherein the process of selecting a legitimate superior variable set from all variables for each of the variable among the partial variables in Step B comprises:

selecting all legitimate superior variable sets from all variables for each variable among the partial variables, calculating the probabilities that the variable gives the legitimate superior variable sets selected for the variable in accordance with the variable records, and determining the current superior variable set for each variable with an importance sampling method with the probabilities obtained in the calculation.

9. The method according to claim 8, wherein the probabilities that the variable gives the legitimate superior variable sets selected for the variable are calculated with the following expression:

$$P(Pa(X_i)_j) = \frac{f(Pa(X_i)_j)}{\sum_{k=1}^{M} f(Pa(X_i)_k)}$$

wherein, $X_i$ is the current variable, $Pa(X_i)_j$ is the $j^{th}$ superior variable set selected for the current variable $X_i$ (j is an integer and $1 \leq j \leq M$), $P(Pa(X_i)_j)$ is the probability that the current variable $X_i$ gives the superior variable set $Pa(X_i)_j$, $f(x)$ is a monotone increasing function in the first quadrant, and $x=Pa(X_i)_j$ or $Pa(X_i)_k$, M is the total number of the superior variable sets selected for the current variable $X_i$, and k is an integer.

10. The method according to claim 8, wherein the probabilities that the variable gives the legitimate superior variable sets selected for the variable are calculated with the following expression:

$$P(Pa(X_i)_j) = \frac{P(X_i | Pa(X_i)_j)^T}{\sum_{k=1}^{M} P(X_i | Pa(X_i)_k)^T}$$

wherein, $X_i$ is the current variable, $Pa(X_i)_j$ is the $j^{th}$ superior variable set selected for the current variable $X_i$ (j is an integer and $1 \leq j \leq M$), $P(Pa(X_i)_j)$ is the probability that the current variable $X_i$ gives the superior variable set $Pa(X_i)_j$, $P(X_i|Pa(X_i)_j)$ is the conditional probability of variable $X_i$ to variable set $Pa(X_i)_j$, $P(X_i|Pa(X_i)_k)$ is the conditional probability of variable $X_i$ to variable set $Pa(X_i)_k$, T is a rational number, M is the total number of the superior variable sets selected for the current variable $X_i$, and k is an integer.

11. The method according to claim 8, wherein the probabilities that the variable gives the legitimate superior variable sets selected for it are calculated with the following expression:

$$P(Pa(X_i)_j) = \frac{\log(P(X_i | Pa(X_i)_j)) + C}{\sum_{k=1}^{M} (\log(P(X_i | Pa(X_i)_k)) + C)}$$

wherein, $X_i$ is the current variable, $Pa(X_i)_j$ is the $j^{th}$ superior variable set selected for the current variable $X_i$ (j is an integer and $1 \leq j \leq M$), $P(Pa(X_i)_j)$ is the probability that the current variable $X_i$ gives the variable set $Pa(X_i)_j$, $P(X_i|Pa(X_i)_j)$ is the conditional probability of variable $X_i$ to variable set $Pa(X_i)_j$, $P(X_i|Pa(X_i)_k)$ is the conditional probability of variable $X_i$ to variable set $Pa(X_i)_k$, C is a positive rational number, M is the total number of superior variable sets selected for the current variable $X_i$, and k is an integer.

12. The method according to claim 1, wherein the method further comprises the following steps after the initial variable dependency among the variables is determined in Step A and before the partial variables are selected from all variables:

A1. selecting all superior variable sets for each variable; calculating the probabilities that the variable gives the superior variable sets selected for the variable, keeping the superior variable sets with probability higher than the predefined value, and retaining all the superior variable sets kept for each variable in a top-to-bottom probability sequence; and the process of selecting legitimate superior variable sets from all variables for each variable among the partial variables in Step B comprises: searching for legitimate superior variable sets for each variable in the superior variable sets kept for the variable in Step A1 in sequence, in accordance with the sequence of the partial variables, and taking the first legitimate superior variable set found as the current superior variable set for the variable.

13. The method according to claim 1, before the Step A, further comprising: obtaining a mapping relationship between variable records and variable types;

wherein the process of determining the initial variable dependency for the variables arbitrarily in Step A comprises: preliminarily determining a variable dependency among the variables for each variable type, in accordance with the mapping relationship;

the variables described in Step A-C are variables of the current type, and the variable dependency is the variable dependency among the variables of the current type; and the method further comprises the following step after Step C: receiving the variable data input, calculating the probabilities that the variable data input gives the optimal variable dependencies of all variable types thereby obtaining the variable data; comparing all the probabilities obtained in the calculation, and taking the type corresponding to the highest probability as the type of the variable data input.

14. The method according to claim 1, after the Step C, further comprising: receiving the variable data input, calculating the probability that the variable data input gives the optimal variable dependency thereby obtaining the variable data; judging whether the probability obtained in the calculation is higher than the predefined value; if the probability is higher than the predefined value, deciding the variable data input is normal; otherwise, deciding the variable data input is abnormal.

15. The method according to claim 1, after the Step C, further comprising: receiving the variable data input, calculating the probability that the variable data input gives the optimal variable dependency thereby obtaining the variable data from the optimal variable dependency; judging whether the probability obtained in the calculation is higher than the predefined value; if the probability is higher than the predefined value, deciding the variable data input pertains to the type corresponding to the optimal variable dependency.

16. The method according to claim 1, after the Step C, further comprising:

receiving the data input of the partial variables, and setting a data value for the variable without data input; and calculating the probability that the data value set for the variable gives the optimal variable dependency thereby obtaining the data value of the variable; judging whether the probability obtained in the calculation is higher than the predefined value; if the probability is higher than the predefined value, accepting the data value set for the variable; otherwise, discarding the data value set for the variable.

17. An apparatus for establishing variable dependency, comprising:

a superior variable set determining module, configured to re-select a superior variable set for each of partial variables with variable records from external input and a current variable dependency, and output a mapping relationship between each of the partial variables and the selected superior variable set;

a variable dependency establishing module, configured to determine an initial variable dependency, update a current variable dependency stored locally in accordance with the mapping relationship between each variable and the superior variable set selected for the variable that is sent from the superior variable set determining module, and then output the updated variable dependency;

a variable dependency judging module, configured to judge whether to accept the variable dependency that is sent from the variable dependency establishing module; if the variable dependency is acceptable and no termination instruction is received, output the variable dependency to the superior variable set determining module, the variable dependency establishing module, and an optimal variable dependency determining module; if the variable dependency is acceptable and a termination instruction is received, output the variable dependency only to the optimal variable dependency determining module;

a termination judging module, configured to judge whether the termination criterion is met; if the termination criterion is met, send a termination instruction to the variable dependency judging module and the optimal variable dependency determining module; and the optimal variable dependency determining module, configured to determine an optimal variable dependency from all of the variable dependencies sent from the variable dependency judging module, after a termination instruction is received from the termination judging module.

18. The apparatus according to claim 17, further comprising:

a variable data type judging module, configured to receive the variable data from the external input and the mapping relationship between variable types and optimal variable dependencies from the optimal variable dependency determining module, calculate probabilities that the variable data input gives the optimal variable dependencies thereby obtaining the variable data, and take the type corresponding to the highest probability as the type of the variable data input.

19. The apparatus according to claim 17, further comprising:

a variable data normal/abnormal judging module, configured to receive the variable data from the external input and the optimal variable dependency from the optimal variable dependency determining module, calculate the probability that the variable data input gives the optimal variable dependency thereby obtaining the variable data, and judging whether the variable data input is normal in accordance with the probability obtained in the calculation.

20. The apparatus according to claim 17, further comprising:

a variable data type judging module, configured to receive the variable data from the external input and the optimal variable dependency from the optimal variable dependency determining module, calculate probability that the variable data input gives the optimal variable dependency thereby obtaining the variable data, and judge whether the variable data input pertains to the type corresponding to the optimal variable dependency in accordance with the probability obtained in the calculation.

21. The apparatus according to claim 17, further comprising:

a variable data forecasting module, configured to receive the variable data from the external input and the optimal variable dependency from the optimal variable dependency determining module, determine a data value for the variable without any data input, calculate the probability that the data value determined for the variable gives the optimal variable dependency thereby obtaining the variable data value, and determine whether to accept the data value set for the variable in accordance with the probability obtained in the calculation.

\* \* \* \* \*